US012553276B2

(12) United States Patent
Sperandio et al.

(10) Patent No.: US 12,553,276 B2
(45) Date of Patent: Feb. 17, 2026

(54) THERMALLY ENHANCED EXTRUDATE FOR WINDOWS AND DOORS

(71) Applicant: Quaker Window Products Co., Freeburg, MO (US)

(72) Inventors: David Sperandio, Freeburg, MO (US); Curtis Weavers, Vienna, MO (US)

(73) Assignee: Quaker Window Products Co., Freeburg, MO (US)

(*) Notice: Subject to any disclaimer, the term of this patent is extended or adjusted under 35 U.S.C. 154(b) by 0 days.

(21) Appl. No.: 18/335,571

(22) Filed: Jun. 15, 2023

(65) Prior Publication Data

US 2023/0323728 A1 Oct. 12, 2023

Related U.S. Application Data

(62) Division of application No. 17/332,550, filed on May 27, 2021, now Pat. No. 11,713,612, which is a (Continued)

(51) Int. Cl.
*E06B 3/263* (2006.01)
*E06B 3/267* (2006.01)
*E06B 3/663* (2006.01)

(52) U.S. Cl.
CPC .......... *E06B 3/26303* (2013.01); *E06B 3/267* (2013.01); *E06B 3/66323* (2013.01); (Continued)

(58) Field of Classification Search
CPC .... E06B 3/267; E06B 3/2675; E06B 3/66323; E06B 2003/26354; E06B 2003/26352; E06B 3/26303
See application file for complete search history.

(56) References Cited

U.S. PATENT DOCUMENTS 3,204,324 A * 9/1965 Nilsen ..................... E06B 3/267
52/309.3
3,798,869 A 3/1974 Nipp
(Continued)

FOREIGN PATENT DOCUMENTS

CA 1143140 A 3/1983
CA 1157247 A 11/1983
(Continued)

OTHER PUBLICATIONS

AAMA TIR-A8-16, Structural Performance of Composite Thermal Barrier Framing Systems, Sep. 2016, American Architectural Manufacturers Association, Schaumburg, IL.

*Primary Examiner* — Andrew J Triggs
(74) *Attorney, Agent, or Firm* — Armstrong Teasdale LLP

(57) ABSTRACT

A thermally enhanced extrudate includes a channel, a first wall, and a second wall. The channel extends along a longitudinal axis from a first end to a second end of the thermally enhanced extrudate and is shaped to receive glass or a frame. The second wall is spaced from the first wall. The first wall and the second wall partially enclose a thermal break extending along the longitudinal axis. The thermal break has a first width defined between the first wall and the second wall at an upper end of the thermal break and a second width defined between the first wall and the second wall at a lower end of the thermal break. The thermally enhanced extrudate further includes a solid insulation material in the thermal break between the first and second walls and formed by curing a flowable material.

7 Claims, 13 Drawing Sheets

Related U.S. Application Data division of application No. 16/808,104, filed on Mar. 3, 2020, now Pat. No. 11,035,167.

(52) U.S. Cl.
CPC ............... *E06B 2003/26352* (2013.01); *E06B 2003/26354* (2013.01)

(56) References Cited

U.S. PATENT DOCUMENTS

| | | | |
|---|---|---|---|
| 3,823,524 | A | 7/1974 | Weinstein |
| 4,067,163 | A | 1/1978 | Hetman |
| 4,257,202 | A | 3/1981 | Biro |
| 4,323,218 | A | 4/1982 | Plum |
| 4,330,919 | A | 5/1982 | Bischlipp et al. |
| 4,342,144 | A | 8/1982 | Doguchi |
| 4,423,578 | A | 1/1984 | Meigs et al. |
| 4,497,103 | A | 2/1985 | Hosooka et al. |
| 4,649,682 | A | 3/1987 | Barrett, Jr. |
| 4,694,552 | A | 9/1987 | Ecker et al. |
| 4,704,839 | A | 11/1987 | Kay |
| 5,022,205 | A | 6/1991 | Ford |
| 5,058,351 | A | 10/1991 | Dunstan |
| 5,187,867 | A * | 2/1993 | Rawlings ................ E06B 3/267 29/418 |
| 5,371,946 | A | 12/1994 | Cameron et al. |
| 5,424,111 | A | 6/1995 | Farbstein |
| 5,454,204 | A | 10/1995 | Jordal |
| D372,540 | S | 8/1996 | Pollard |
| 6,405,498 | B1 | 6/2002 | Riegelman |
| 6,500,550 | B1 * | 12/2002 | Tsuboi ................ B29C 59/103 428/458 |
| 7,096,640 | B1 | 8/2006 | Chevian et al. |
| 7,694,472 | B2 | 4/2010 | Rawlings |
| 8,322,090 | B2 | 12/2012 | Moriya et al. |
| 8,776,443 | B2 | 7/2014 | Bienick |
| 9,068,344 | B2 | 6/2015 | Mckenna |
| 9,328,549 | B1 | 5/2016 | Alexander et al. |
| 9,441,412 | B1 | 9/2016 | Hooper, Jr. et al. |
| 9,593,222 | B2 | 3/2017 | Taylor et al. |
| 9,963,923 | B2 | 5/2018 | Jetzinger et al. |
| 10,370,893 | B2 | 8/2019 | Hooper, Jr. |
| 11,035,167 | B1 * | 6/2021 | Sperandio ........... E06B 3/26303 |
| 11,713,612 | B2 * | 8/2023 | Sperandio ............ E06B 3/2675 52/717.02 |
| 2009/0025325 | A1 | 1/2009 | Gillespie et al. |
| 2010/0115850 | A1 | 5/2010 | Siodla et al. |
| 2023/0323728 | A1 * | 10/2023 | Sperandio ........... E06B 3/26347 52/717.02 |

FOREIGN PATENT DOCUMENTS

| | | |
|---|---|---|
| CA | 2166593 A1 | 7/1997 |
| CA | 2101672 C | 12/1997 |
| CA | 2928657 C | 2/2017 |
| CN | 1195738 A | 10/1998 |
| CN | 102031914 A | 4/2011 |
| CN | 101377113 B | 12/2011 |
| CN | 102953632 A | 3/2013 |
| CN | 203050387 U | 7/2013 |
| CN | 203484432 U | 3/2014 |
| CN | 103480683 B | 7/2015 |
| CN | 104908194 B | 6/2018 |
| CN | 109482666 A | 3/2019 |
| CN | 208841680 U | 5/2019 |
| CN | 110094137 A | 8/2019 |
| CN | 209308591 U | 8/2019 |
| DE | 19818769 A1 | 11/1999 |
| DE | 19818769 C2 | 7/2001 |
| EP | 591481 | 4/1994 |
| EP | 1126122 B1 | 4/2004 |
| GB | 2133824 A | 8/1984 |
| GB | 2150181 A | 6/1985 |
| GB | 2523638 B | 5/2016 |
| JP | 3232047 B2 | 11/2001 |
| JP | 2015168937 A | 9/2015 |
| KR | 2019087926 A | 7/2019 |
| WO | 2013022160 A1 | 2/2013 |
| WO | 2019090133 A1 | 5/2019 |

* cited by examiner

THERMALLY ENHANCED EXTRUDATE FOR WINDOWS AND DOORS

CROSS-REFERENCE TO RELATED APPLICATION

This application is a divisional of U.S. patent application Ser. No. 17/332,550, filed on May 27, 2021 and granted as U.S. Pat. No. 11,713,612, which is a divisional of U.S. patent application Ser. No. 16/808,104, filed on Mar. 3, 2020 and granted as U.S. Pat. No. 11,035,167, the disclosures of which are hereby incorporated by reference in their entirety.

FIELD

The field relates to thermally enhanced extrudates for windows and doors, and in particular, thermally enhanced extrudates with thermal breaks.

BACKGROUND

Doors and windows often include a frame supporting and/or encasing one or more glass panes. The frame may be constructed, for example, of one or more extrudates that are formed using an extrusion process. The extrudates may include a thermal insulation material that is positioned within a channel defined by U-shaped or C-shaped walls of the extrudates. However, the U-shaped or C-shaped walls may be difficult to construct and may be prone to breaking or otherwise losing their shape during assembly of the extrudates. In addition, the thermal insulation material may cause the C-shaped and U-shaped walls of the extrudates to warp and deform when the thermal insulation material is positioned within the channel.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a thermally enhanced extrudate includes a channel, a first wall, and a second wall. The channel extends along a longitudinal axis from a first end to a second end of the thermally enhanced extrudate and is shaped to receive glass or a frame. The second wall is spaced from the first wall. The first wall and the second wall partially enclose a thermal break extending along the longitudinal axis. The thermal break has a first width defined between the first wall and the second wall at an upper end of the thermal break and a second width defined between the first wall and the second wall at a lower end of the thermal break. The first width and the second width are equal. The thermally enhanced extrudate further includes a solid insulation material in the thermal break between the first and second walls and formed by curing a flowable material.

Another aspect is directed to a frame including a first thermally enhanced extrudate, and a second thermally enhanced extrudate attached to the first thermally enhanced extrudate. The second thermally enhanced extrudate includes a channel extending along a longitudinal axis from a first end to a second end of the thermally enhanced extrudate and shaped to receive glass. The second thermally enhanced extrudate also include a first wall and a second wall spaced from the first wall. The first wall and the second wall partially enclose a thermal break extending along the longitudinal axis. The thermal break has a first width defined between the first wall and the second wall at an upper end of the thermal break and a second width defined between the first wall and the second wall at a lower end of the thermal break. The first width and the second width are equal. The second thermally enhanced extrudate further includes a solid insulation material in the thermal break between the first and second walls and formed by curing a flowable material.

In another aspect, a method of manufacturing a thermally enhanced extrudate for a door or a window includes providing an extrudate defining a longitudinal axis from a first end to a second end of the extrudate. The extrudate includes a channel extending along the longitudinal axis and shaped to receive glass or a frame. The extrudate includes a first wall, and a second wall spaced from the first wall. The first and second walls enclose a cavity extending along the longitudinal axis. The method also includes placing a flowable material into the cavity. The flowable material may cure to create a solid insulation material in the cavity. The solid insulation material in the cavity defines a thermal break. The extrudate resists warping of the extrudate as the flowable material cures. The thermal break has a first width defined between the first wall and the second wall at an upper end of the thermal break and a second width defined between the first wall and the second wall at a lower end of the thermal break. The first width and the second width are equal.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
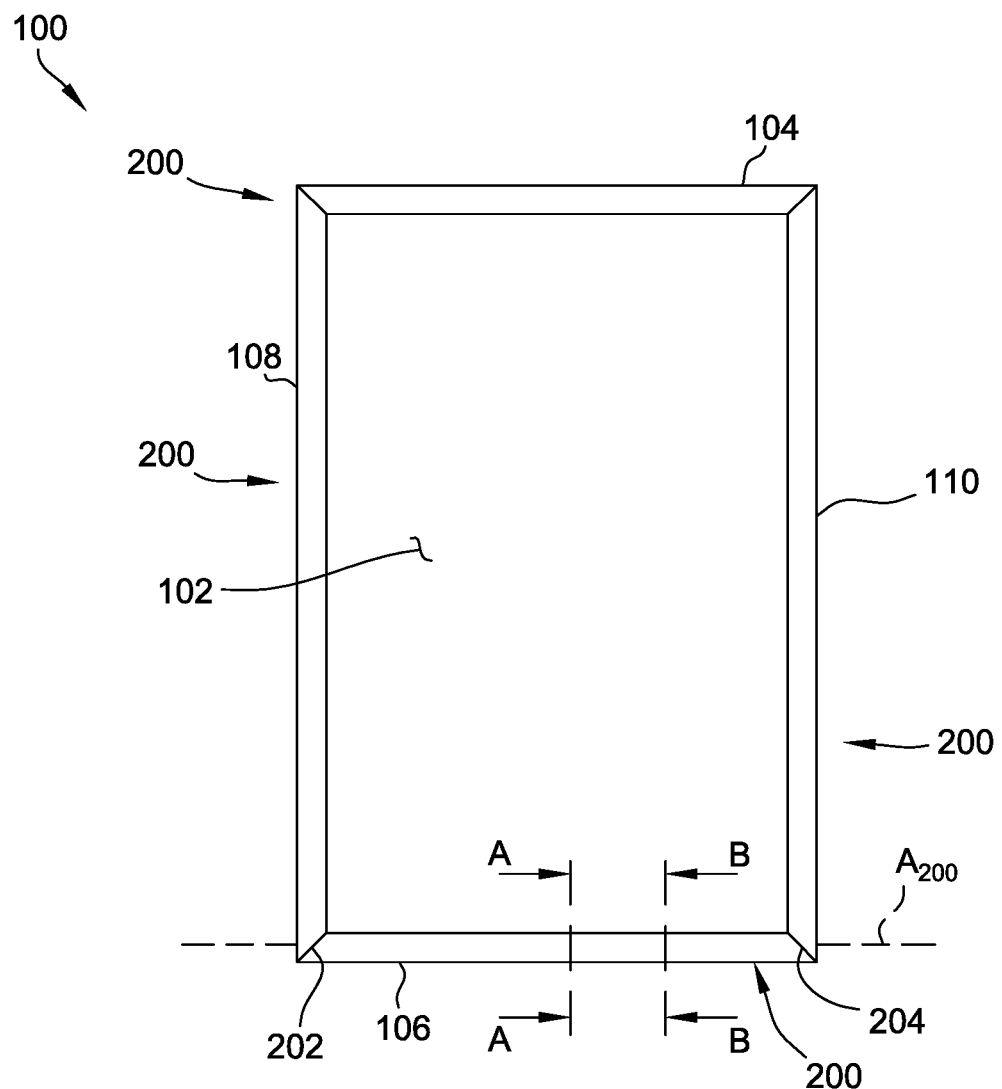
FIG. 1 is a front view of an example frame including thermally enhanced extrudates.

Referring to FIG. 1, an example frame is indicated generally at 100. The frame 100 is assembled of two or more thermally enhanced extrudates, in this embodiment suitably attached to one another. Each thermally enhanced extrudate is indicated generally at 200. The thermally enhanced extrudates 200 support a unit 102 such as a glass unit or an operable vent frame, such that the frame 100 circumscribes the unit 102. In some other example embodiments, the unit 102 may include one or more glass panes, acrylic sheets, window screens, frames, sashes, and the like.

In the example, the frame 100 includes four thermally enhanced extrudates 200, each thermally enhanced extrudate bonded or attached to the adjacent thermally enhanced extrudates to form the frame 100 in a generally rectangular shape. The frame 100 includes a top thermally enhanced extrudate 104, a bottom thermally enhanced extrudate 106, a first side thermally enhanced extrudate 108, and a second side thermally enhanced extrudate 110. The top thermally enhanced extrudate 104 and the bottom thermally enhanced extrudate 106 extend parallel to each other. The first side thermally enhanced extrudate 108 and the second side thermally enhanced extrudate 110 extend between the top thermally enhanced extrudate 104 and the bottom thermally enhanced extrudate 106 and parallel to each other. In other examples, the frame 100 may be assembled by attaching two or more of the thermally enhanced extrudates 200 together to form the frame 100 in different shapes and dimensions.

The frame 100 may be used for a variety of applications, for example and without limitation, for windows or doors. The frame 100 may include additional or alternative features or enhancements. For example and without limitation, the frame 100 may include corner keys, cladding, and/or weather stripping. In some examples, the frame 100 and the unit 102 may be supported by a mounting frame (not shown). For example, the frame 100 and the unit 102 may be connected to the mounting frame such that the frame 100 and unit 102 form a sash that is positionable relative to the mounting frame.

In this illustrated embodiment, the unit 102 may include an insulated glass unit having a first glass pane and a second glass pane. The second glass pane may be spaced from the first glass pane such that the first glass pane and the second glass pane define a pocket therebetween. The pocket may be filled with an insulation material such as argon gas. In other embodiments, the thermally enhanced extrudate 200 may support any unit 102 that enables the frame 100 to function as described. For example, in some embodiments, a third glass pane may be disposed between the first glass pane and the second glass pane. In other examples, the unit 102 includes a single pane of glass.

Figure 2:
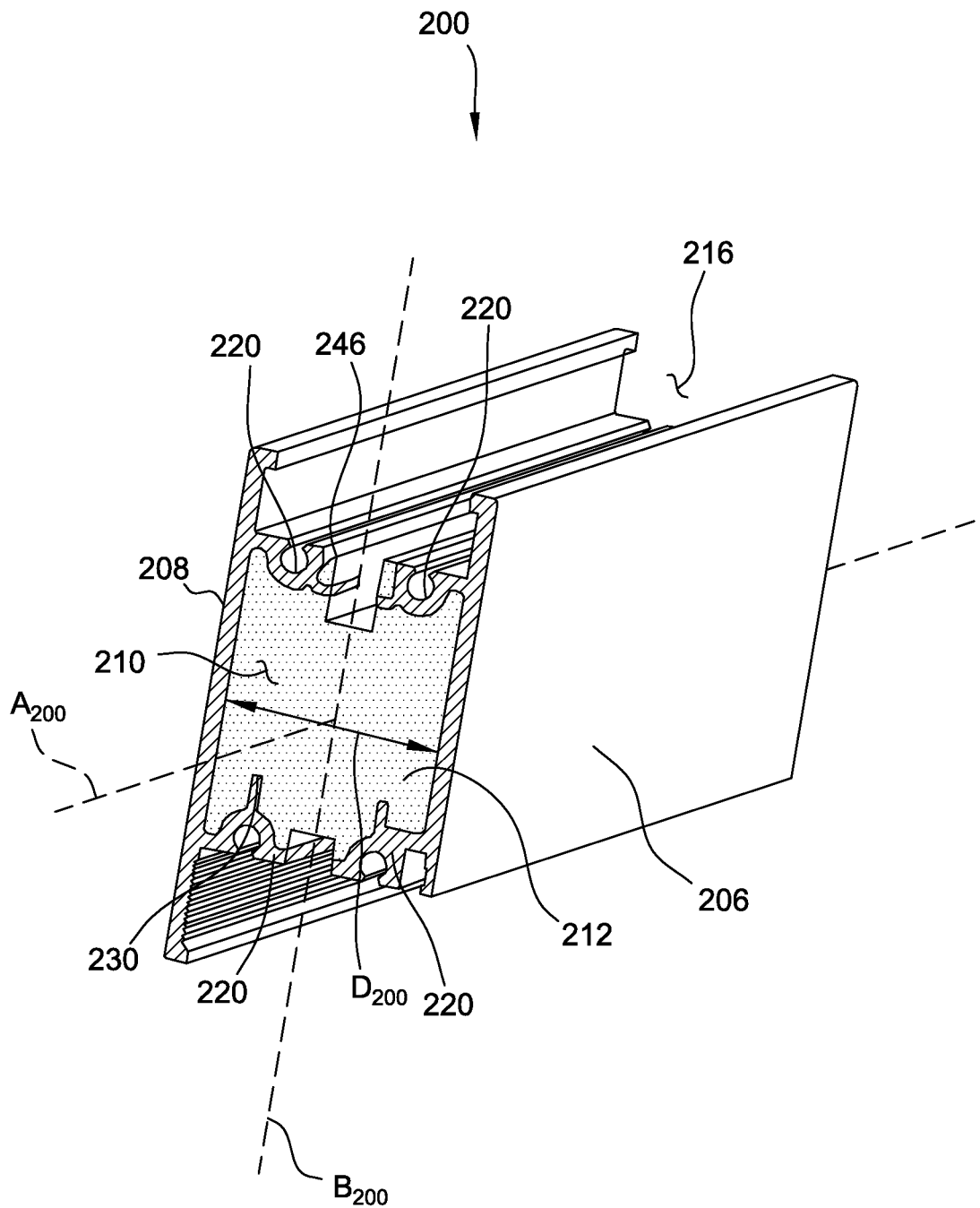
FIG. 2 is an enlarged perspective view of a portion of the thermally enhanced extrudate shown in FIG. 1, the thermally enhanced extrudate being cut along section line A-A and section line B-B shown in FIG. 1.
Figure 3:
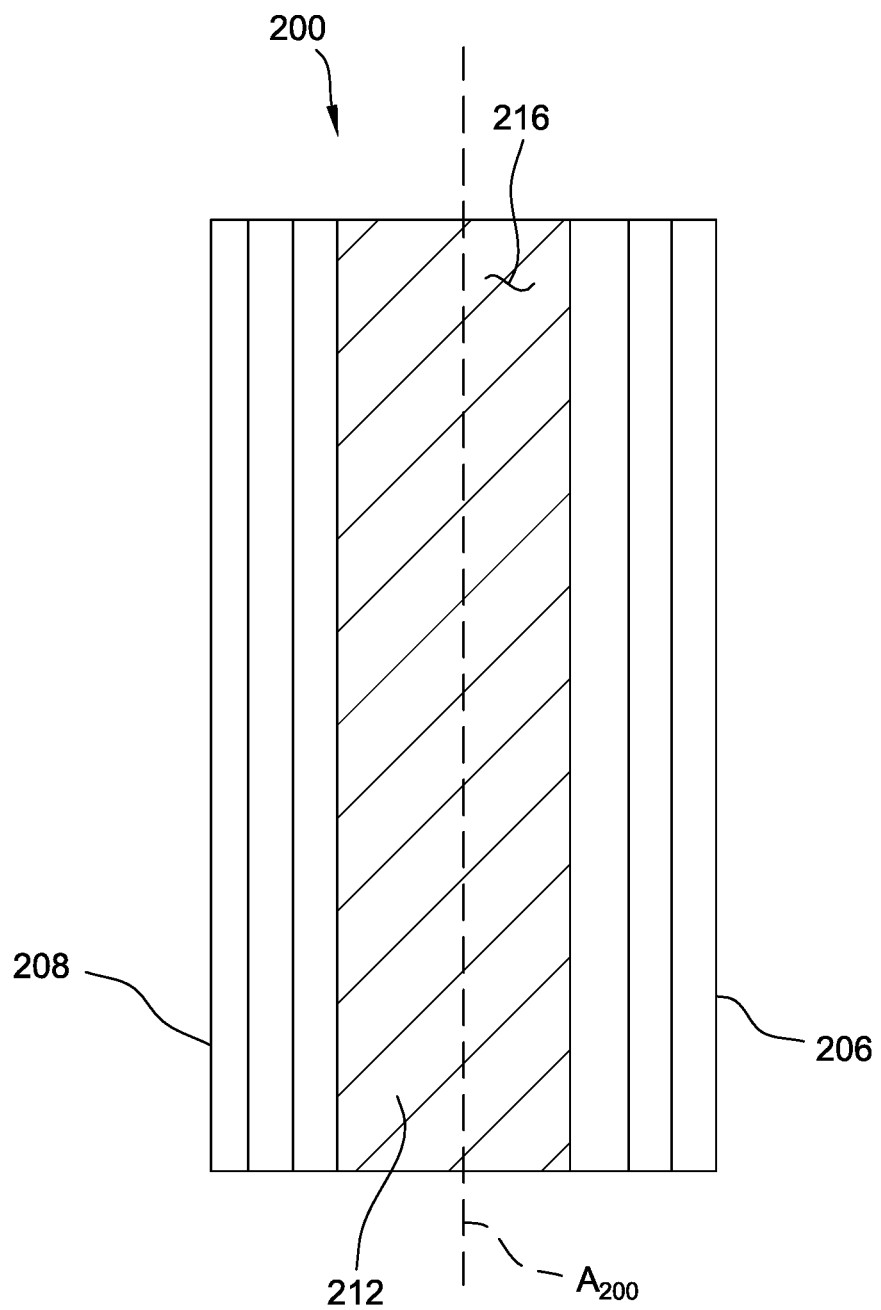
FIG. 3 is a top view of the thermally enhanced extrudate shown in FIG. 2.
Figure 4:
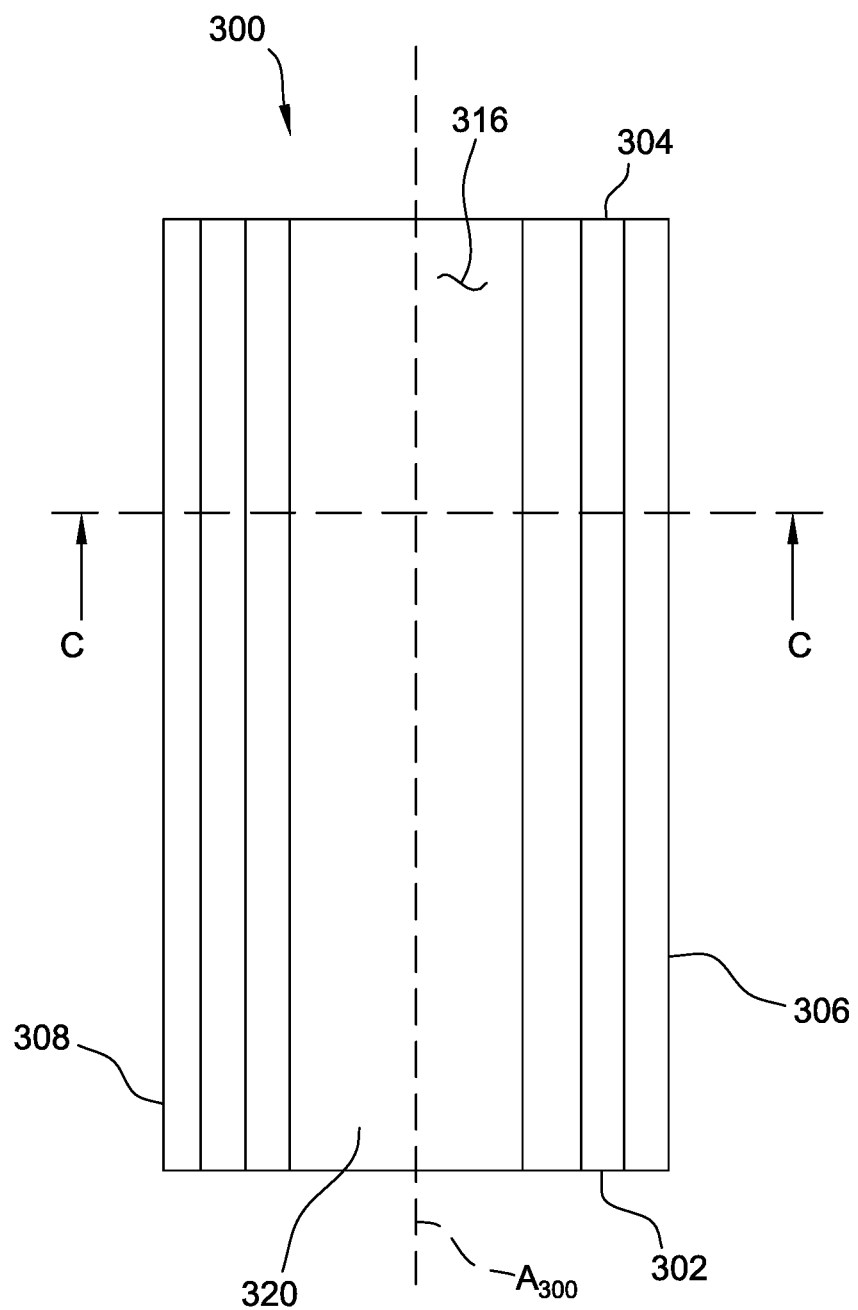
FIG. 4 is a top view of an example extrudate having a completely enclosed cavity.

In reference to FIGS. 1-3, the thermally enhanced extrudate 200 includes a first end 202 and a second end 204 and has a longitudinal axis $A_{200}$ that extends from the first end 202 to the second end 204. Referring specifically to FIG. 2, the thermally enhanced extrudate 200 includes a first wall 206, a second wall 208, and ledges 220 attached to the first and second walls. The first wall 206 and the second wall 208 are separated by a distance $D_{200}$ and define a thermal break 210 therebetween. The thermally enhanced extrudate 200 has a transverse line $B_{200}$ that is perpendicular to the longitudinal axis $A_{200}$. In some example embodiments, the thermal break 210 is symmetric about a plane defined by the longitudinal axis $A_{200}$ and the transverse axis $B_{200}$. In other example embodiments, the thermal break 210 may not be symmetric about a plane defined by the longitudinal axis $A_{200}$ and the transverse axis $B_{200}$.

The thermally enhanced extrudate 200 includes a solid insulation material 212 positioned between the first wall 206 and the second wall 208 and at least partly forming the thermal break 210. The solid insulation material 212 may be formed using a liquid material that solidifies to form the solid insulation material 212. The solid insulation material 212 has a thermal conductance less than the material of the first wall 206, the second wall 208, and the ledges 220. For example, the solid insulation material 212 may have a thermal conductance that is dependent on the density of the solid insulation material 212. The thermally enhanced extrudate 200 may be filled with any suitable solid insulation material 212 having any suitable density. In some example embodiments, the solid insulation material 212 may have a density in a range of about 10 pounds per cubic feet (lbs./ft$^3$) to about 70 lbs./ft$^3$. The solid insulation material substantially fills the thermal break 210 and extends along the longitudinal axis $A_{200}$ between the first wall 206 and the second wall 208 reducing heat transfer through the thermally enhanced extrudate 200.

The thermally enhanced extrudate 200 further includes a channel 216 extending along the longitudinal axis $A_{200}$ that is sized and shaped to receive the unit 102. The channel 216 is defined by the first wall 206 and the second wall 208 and the ledges 220. The channel 216 is sized and shaped to receive the unit 102. For example, the unit 102 sits on the ledges 220 between the first wall 206 and the second wall 208.

The thermally enhanced extrudate 200 may include any suitable materials. For example, in this embodiment, the first and second walls 206, 208 and the ledges 220 include metals or metal alloys such as, for example and without limitation, aluminum, aluminum alloy, steel, or steel alloys. In other embodiments, the thermally enhanced extrudate 200 may include any material such as, for example and without limitation, metal, fiberglass, and vinyl.

The thermally enhanced extrudate 200 further includes one or more ribs 230 that extend into the thermal break 210. The one or more ribs 230 may extend from at least one of the first wall 206, the second wall 208, and/or the ledges 220. The one or more ribs 230 extend at least partly along the longitudinal axis $A_{200}$ of the thermal break 210.

The thermally enhanced extrudate 200 further includes one or more cleats 246 that extend from at least one of the first wall 206 and the second wall 208 into the thermal break 210 and are anchored in the solid insulation material 212 between the first wall 206 and the second wall 208. In some examples, the cleats 246 may be arranged in an alternating pattern such that a first cleat 246 extends from the first wall 206 and a second cleat 246 extends from the second wall 208.

In reference to FIGS. 4-9, an extrudate 300 may be used to assemble one or more of the thermally enhanced extrudates 200 (shown in FIG. 1). The extrudate 300 includes a first end 302 and a second end 304. The extrudate 300 includes a first wall 306, a second wall 308 spaced from the first wall, a first flange 320, and a second flange 322. The first and second flanges 320, 322 extend between the first wall 306 and the second wall 308. The extrudate 300 has a longitudinal axis $A_{300}$ that extends from the first end 302 to the second end 304 and a transverse axis $B_{300}$ that extends perpendicular to the longitudinal axis $A_{300}$. The extrudate 300 includes a channel 316 extending along the longitudinal axis $A_{300}$ and defined by the first wall 306, the second wall 308, and the first flange 320. The channel 316 is sized and shaped to receive the unit 102 (shown in FIG. 1).

The first wall 306 is spaced apart from the second wall 308 by a distance of $D_{300}$. The first wall 306 and the second wall 308 are parallel such that a first distance between upper ends of the first and second walls is substantially equal to a second distance between lower ends of the first and second walls. The first wall 306 and the second wall 308 are able to provide a designated tolerance of variation in $D_{300}$ because the extrudate 300 is formed as a hollow shape. For example, the difference between the first distance and the second distance may be in a range of 0.001 in. to 0.005 in.

The extrudate 300 further includes a cavity 310 that is completely enclosed by the first wall 306, the second wall 306, the first flange 320, and the second flange 322. The first and second walls 306, 308 and first and second flanges 320, 322 define the cavity 310 along the longitudinal axis $A_{300}$. The cavity 310 includes a width $W_{310}$ measured perpendicular to the longitudinal axis $A_{300}$. In the example, the width $W_{310}$ is substantially equal to the distance $D_{300}$. The cavity 310 also includes a depth $D_{310}$ which is the distance between the first flange 320 and the second flange 322.

The extrudate 300 may be made of any suitable materials. In some examples, the extrudate 300 may be made of, for example and without limitation, metal, metal alloys such as aluminum and aluminum alloys, vinyl, and/or fiberglass.

In the example embodiment, the extrudate 300 may be formed by extruding a material, such as aluminum, using a die such that extrudate 300 is formed of a completely enclosed hollow tube shape. Extruding material using a tooling die to create a hollow shape may have some advantages over extruding more complex structures, e.g., semi-hollow extrusions. The hollow tube shape requires a tooling die that may experiences less wear compared with a tooling die required to form a semi-hollow shape.

Additionally or alternatively, extruding a semi-hollow shape having a cross section partially enclosing a void requires the use of a tooling die with a tongue portion connected to the main body of the tooling die. The ratio of the area of the void to the size of the gap where the tongue portion is connected to the body of the die may be referred to as the tongue ratio. The longevity of the tooling die is at least partially dependent on this tongue ratio. In some cases, higher tongue ratios will result in decreased longevity of the tooling die. Extruding a semi-hollow shape having a gap with a width of $W_o$ equal to $W_{340}$ that opens into a void including a width of $W_v$ equal to $W_{300}$ may result in a tongue ratio that exceeds some manufacturing recommendations for the tongue ratios for aluminum semi-hollow extrusion. In contrast, extruding a hollow shape completely enclosing a void in its cross section will allow use of a tooling die that may be more durable and less prone to fatigue and failure than tooling dies used to extrude semi-hollow shapes.

The first wall 306 and the second wall 308 each have a wall thickness $T_{300}$. The wall thicknesses $T_{300}$ of the first wall 306 and the second wall 308 are substantially equal. In other examples, the first wall 306 and the second wall 308 may have different thicknesses and/or non-uniform wall thicknesses $T_{300}$.

The first flange 320 and the second flange 322 have a flange thickness $T_{301}$. The flange thicknesses $T_{301}$ of the first flange 320 and the second flange 322 are substantially equal. In other examples, the first flange 320 and the second flange 322 may have different and/or a non-uniform flange thickness $T_{301}$. In the example, the wall thickness $T_{300}$ is substantially equal to the flange thickness $T_{301}$.

The extrudate 300 may include one or more ribs 330 that extend into the cavity 310. The one or more ribs 330 may extend from at least one of the first wall 306, the second wall 308, the first flange 320, and/or the second flange 322. The one or more ribs 330 extend at least partly along the longitudinal axis $A_{330}$ of the cavity 310. The ribs 330 increase the rigidity of the extrudate 300 and reduce stress concentrations during an extrusion process.

Figure 6:
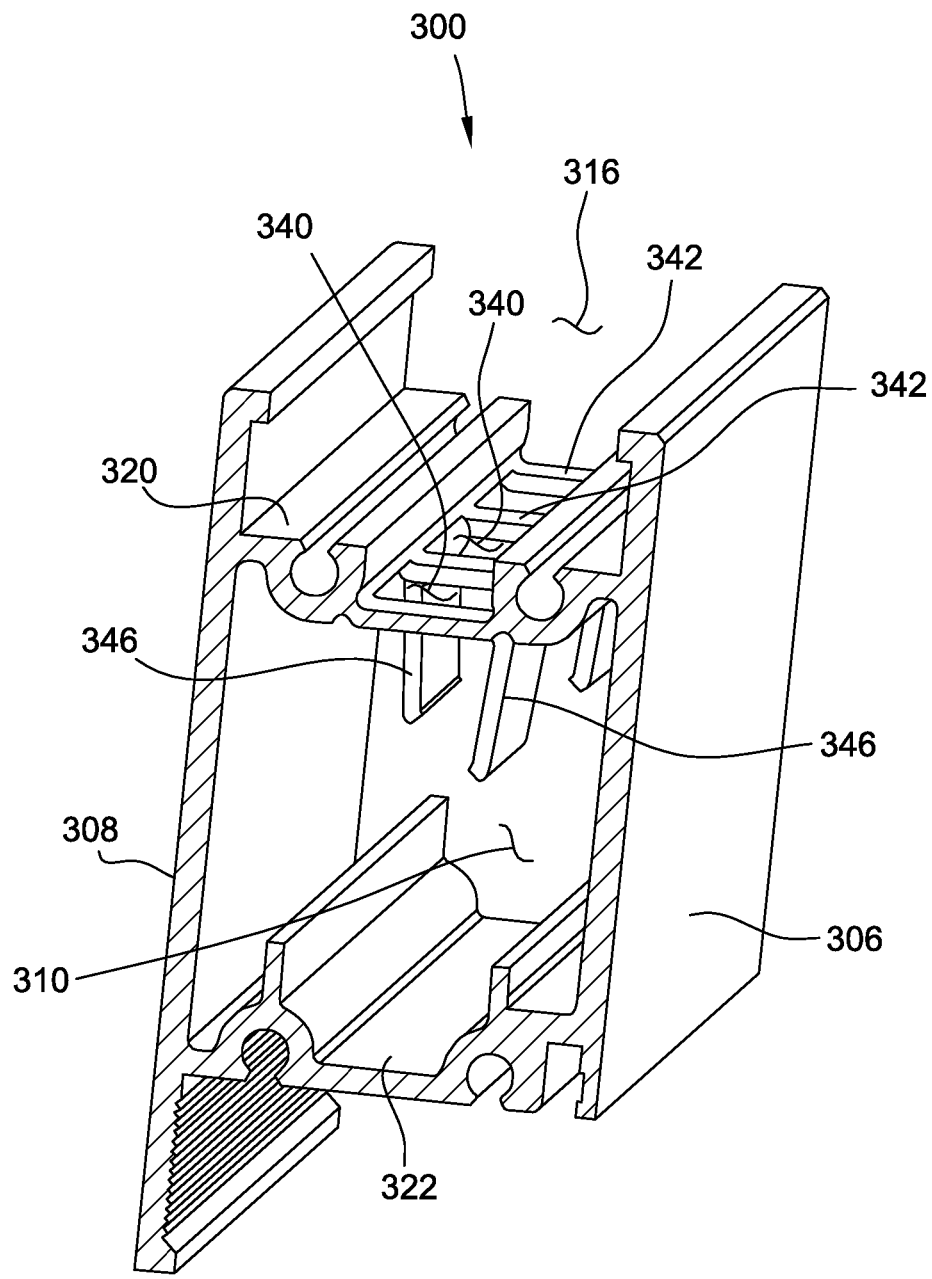
FIG. 6 is an enlarged perspective view of a portion of the extrudate shown in FIG. 4, the extrudate including a first side, a second side, a first flange, bridges extending between the first side and the second side, and openings in the first flange.
Figure 7:
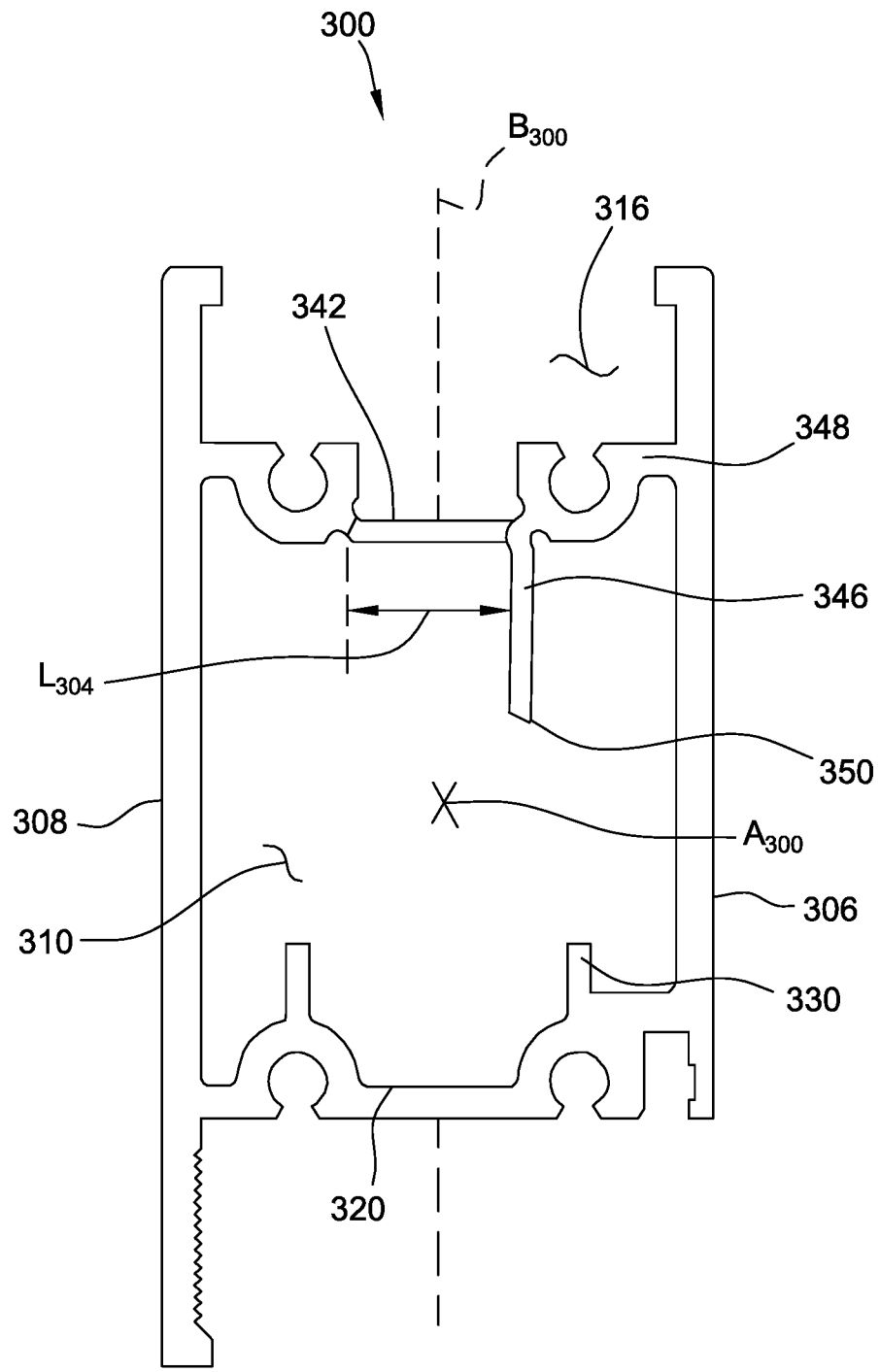
FIG. 7 is a cross-sectional view along line C-C of the extrudate shown in FIG. 4, the extrudate including openings and bridges.
Figure 8:
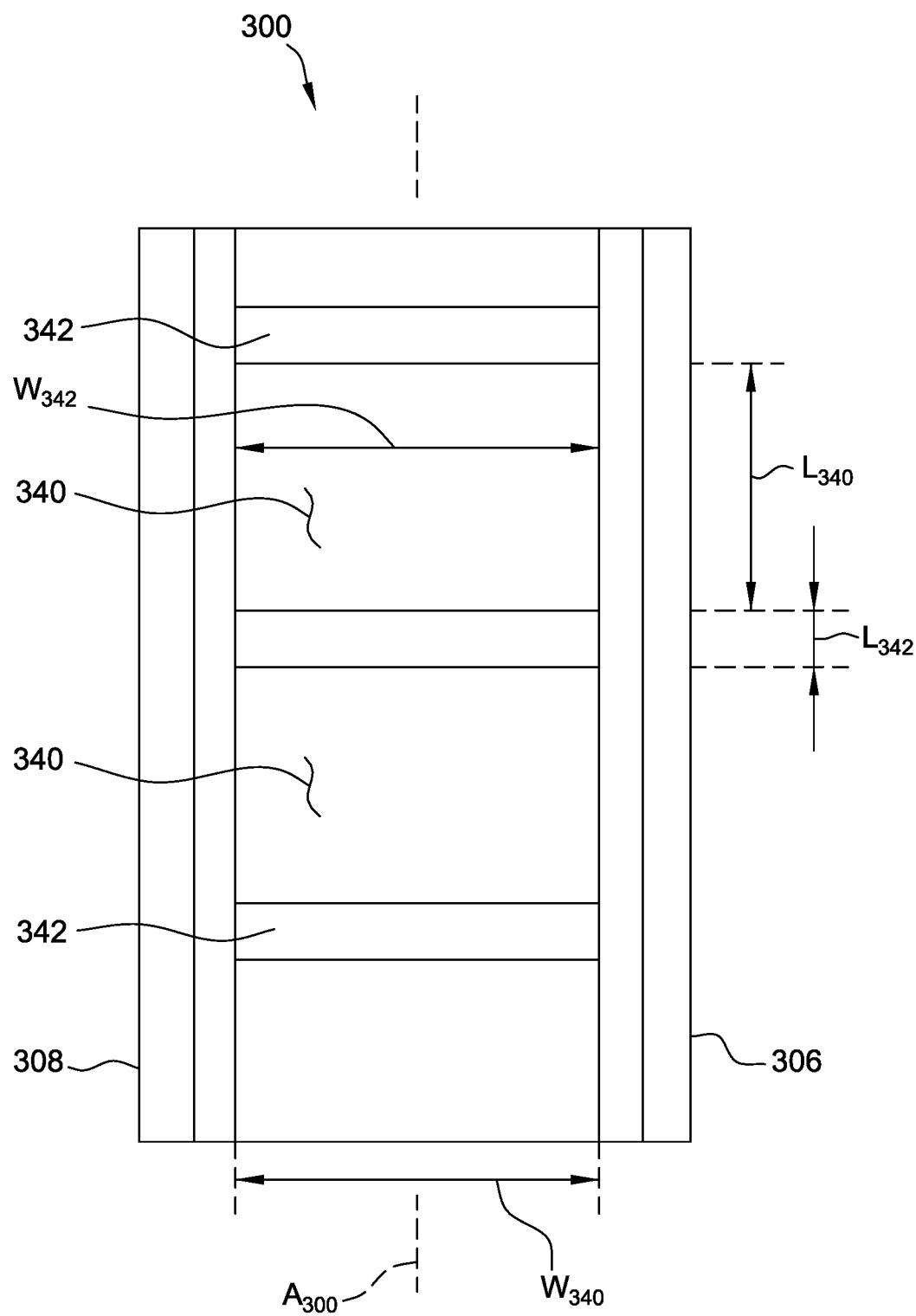
FIG. 8 is a top view of a portion of the extrudate shown in FIG. 4.

Referring now to FIGS. 6-8, a plurality of openings 340 may be formed in the extrudate 300. In the example, the openings 340 are formed in the first flange 320. In other examples, the openings 340 may be formed in the second flange 320. The openings 340 are formed at intervals along the longitudinal axis $A_{300}$ of the extrudate 300. The remaining portions of the first flange 320 between the openings 340 form bridges 342 extending between and connecting the first wall 306 and the second wall 308. The bridges 342 provide additional structural support and rigidity to the extrudate 300 by joining the first wall 306 and the second wall 308.

For example, the openings 340 may be formed by cutting or punching a portion of the first flange 320. In some examples, a punch and die may be used to form the openings 340. For example, a die including an edge shaped to cut the desired boundary of the openings 340 is forced through the first flange 320 using a punch. In some cases the die may be placed within the cavity 310 such that the die is pressed against the first flange 320. Then the press may be forced against the first flange 320, pressing the first flange against the edge of the die. In other examples, the openings 340 are formed in the extrudate 300 as the extrudate 300 is formed.

The bridges 342 and openings 340 may be any suitable sizes and/or shapes. In the example, the openings 340 have an opening length $L_{340}$ extending along the longitudinal axis $A_{300}$ and a width $W_{340}$ extending perpendicular to the longitudinal axis $A_{300}$. The bridges 342 have a bridge length $L_{342}$ extending along the longitudinal axis $A_{300}$ and a width $W_{342}$ extending perpendicular to the longitudinal axis $A_{300}$. In the example, the opening length $L_{340}$ is greater than the bridge length $L_{340}$. In some example embodiments, a ratio of the opening length $L_{340}$ to the bridge length $L_{342}$ is at least 2 (i.e., the opening length $L_{340}$ may be at least twice the bridge length $L_{342}$). The width $W_{340}$ and the width $W_{342}$ are substantially equal. The bridges 342 and the openings 340 are rectangles. In other examples, the plurality of openings 340 are not the same size or shape. For example, one or more openings 340 may be longer and/or shorter than other openings 340. Alternatively or additionally, the openings 340 may be formed at irregular intervals along the longitudinal axis $A_{300}$.

The extrudate 300 may include at least one cleat 346 that extends into the cavity 310. The cleats 346 are attached to the first and second walls 306, 308 alongside at least one opening 340 between the first and second walls. The cleat 346 may be formed before, during, or after the openings 340 are produced in the extrudate 300. For example, the cleat 346 may include a portion of the first flange 320 that is forced into the cavity 310 when the openings 340 are cut or punched in the first flange 320. In some examples, the openings 340 are formed by cutting a portion of the first flange 320 using a die or a punch. Accordingly, the cleats 346 may be formed from a cut portion of the first flange that is bent into the cavity 310.

The cleat 346 may include a cleat first end 348 and a cleat second end 350. The cleat first end 348 is attached to the first wall 306 and/or the second wall 308. The cleats 346 are arranged and attached to the first wall 306 or the second wall 308 in an alternating pattern, such that adjacent cleats 346 extend from opposite first and second walls 306, 308. Each cleat 346 may be bent such that that the cleat is non-linear and the cleat second end 350 is disposed within the cavity 310. In some examples, the cleats 346 may be bent and extend into the cavity 310 such that a portion of each cleat 346 is approximately parallel to the first wall 306 and the second wall 308. Each cleat 346 extends along the first wall 306 or the second wall 308 in a direction parallel to the longitudinal axis $A_{300}$ and has a cleat length, extending along the longitudinal axis $A_{300}$. The cleat length may be approximately equal to the opening length $L_{340}$. In other examples, the cleats 346 may extend between the first wall 306 and the second wall 308 and in a direction perpendicular to the longitudinal axis $A_{300}$. For example, in some examples, the cleat first end 348 of the cleat 346 may be coupled to at least one of the bridges 342.

In reference to FIGS. 7-10, the openings 340 define a passageway into the cavity 310 and are sized such that flowable material 352 may be positioned within the cavity 310 through one or more of the openings 340. For example, the flowable material may be positioned within the cavity 310 by pouring, inserting, injection, and/or packing the flowable material 352 through the openings 340 and into the cavity 310.

Figure 9:
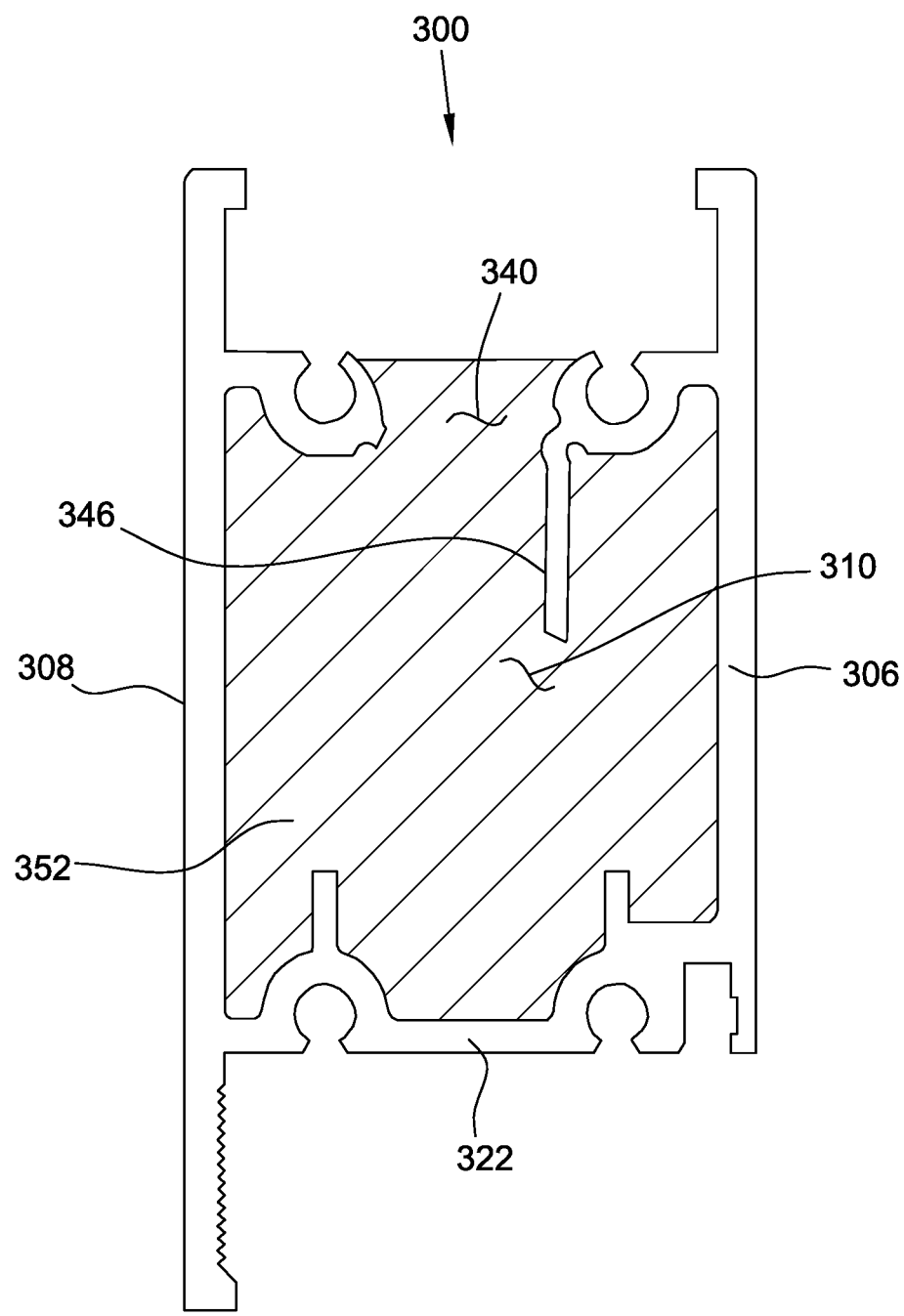
FIG. 9 is an end view of the extrudate shown in FIG. 4, the cavity of the extrudate is filled with an insulation material that is in liquid form when initially poured in place.

With reference to FIG. 9, the flowable material 352 is non-solid. The flowable material 352 may have properties enabling the flowable material 352 to flow into corners and edges of the cavity 310 and conform to the shape of the cavity 310. For example, the flowable material 352 may include a liquid, a gel, and/or foam. In some examples, the flowable material 352 has viscosity that limits substantial flow along the longitudinal axis $A_{300}$ of the cavity 310. Accordingly, the flowable material 352 may be positioned into the cavity 310 through two or more openings 340 spaced apart along the longitudinal axis $A_{300}$ such that the flowable material 352 is evenly distributed along the longitudinal axis $A_{300}$ within the cavity 310. In the example, the cavity 310 is substantially filled with the flowable material 352.

Figure 10:
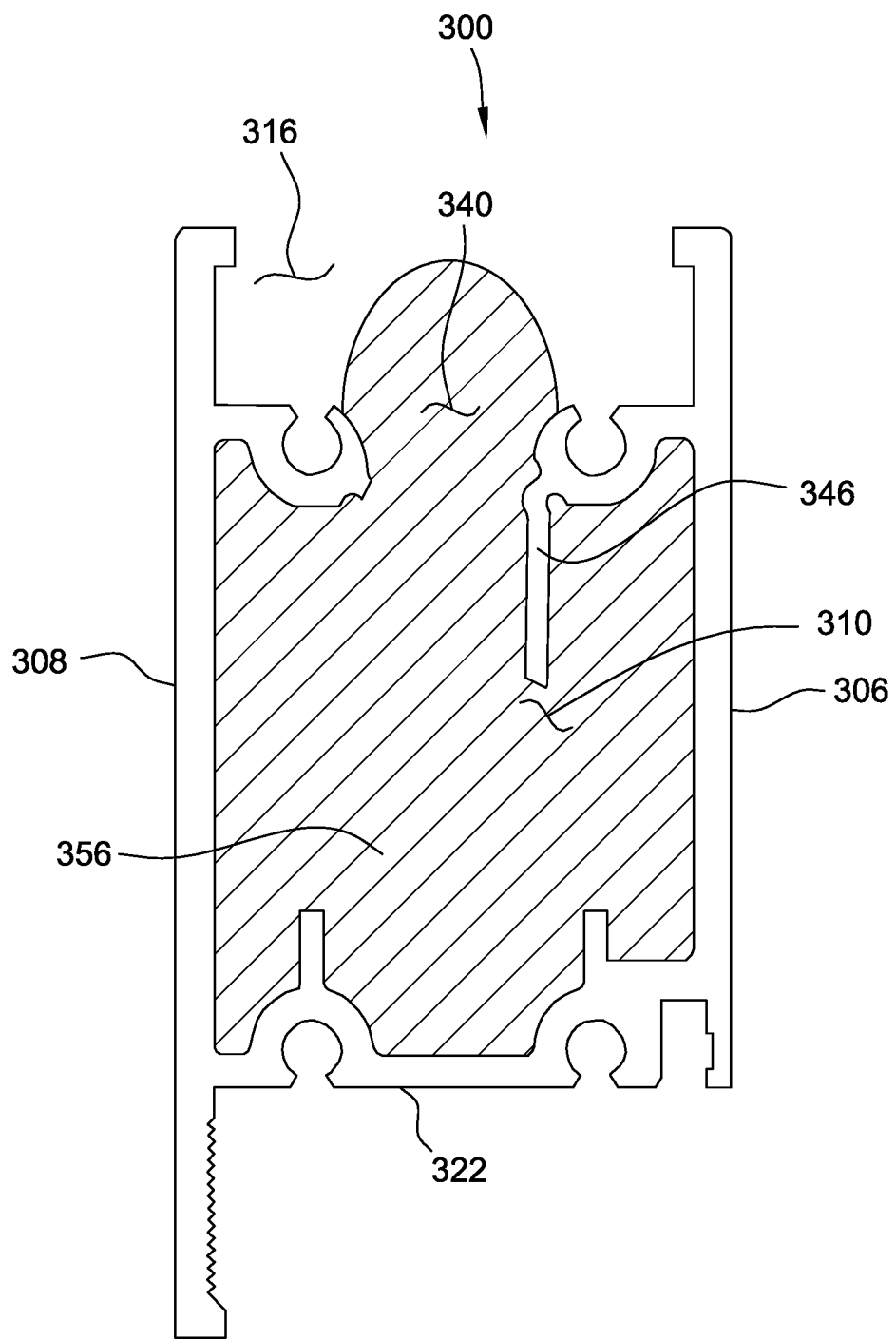
FIG. 10 is a front view of a thermally enhanced extrudate including a thermal insulation material that has cured and solidified.

In this example, the flowable material 352 cures to form a solid insulation material 356. In some examples, the flowable material 352 may include a two part epoxy and/or polyurethane foam that cure to form the solid insulation material 356. For example, curing is the process of the flowable material 352 transforming from a non-solid to a solid, as shown in FIG. 10. Curing may occur through one or more processes including for example and without limitation, chemical reactions, heating or drying, and/or water evaporation.

The extrudate 300 with the flowable material 352 within the cavity 310 may be positioned in a controlled environment during the curing process. The curing process may be expedited by drying the material, heating the material, and/or catalysts. In some examples, the curing process may require and/or be facilitated by supplemental heating of the flowable material 352. For example, after the flowable material 352 is positioned within the cavity 310 and the extrudate 300 filled with the flowable material 352, the extrudate 300 may be placed near a heat source, e.g., near a heating lamp, within a heated chamber, and/or under a thermal covering. In other examples, the flowable material 352 may be heated prior to positioning the flowable material 352 within the cavity 310. The flowable material 352 may also be exposed to ambient environment during the curing process.

In addition, the flowable material 352 may release heat as the flowable material 352 cures to form the solid insulation material 356. For example, the curing process may include an exothermic reaction. Further, the flowable material 352 may also expand during the curing process. For example, a portion of the flowable material 352 may expand through the one or more openings 340 during the curing process and at least a portion of the solid insulation material 356 may extend out of the cavity 310 through the one or more openings 340 (shown in FIG. 10). In some cases, the volume of the flowable material 352 may increase by at least 500% as the flowable material 352 cures to form the solid insulation material 356. As the flowable material 352 cures and expands, air between the first wall 306 and the second wall 308 may be displaced and escape through one or more of the openings 340 along the length of the extrudate 300. Accordingly, the extrudate 300 reduces air voids or pockets that may be present in conventional insulation material such as processes where the material is inserted into the cavity through an end of the thermally enhanced extrudate.

The bridges 342 connecting the first wall 306 and the second wall 308 may provide additional structural support to the extrudate 300 as the flowable material 352 cures, thereby limiting warping and/or deformation of the first wall 306 and the second wall 308 that may occur due to heat generation and expansion of the flowable material 352 during the curing process. For example, the first wall 306 and the second wall 308 may be substantially parallel before and after the flowable material 352 cures and the thermal break may have a substantially constant width.

The extrudate 300 of this embodiment includes a hollow shape having a completely enclosed space. As a result, the extrudate 300 is structural rigid and resists deformation. In contrast, conventional structures including semi-hollow metal extrusions may not have the sufficient structural rigidity to resist additional stress and decreased strength caused during heat generation and expansion of the insulation material. For example, the curing process has been known to cause warping and/or deformation to the walls of the semi-hollow metal extrusion. For example, the walls of a semi-hollow extruded shape may bend or deform outward as the insulation material cures.

In some examples, after the flowable material 352 cures into the solid insulation material 356 and the solid insulation material 356 cools, the solid insulation material 356 may contract and/or shrink within the cavity 310. In some cases, the shrinkage may be most pronounced along a longitudinal axis of the cavity for the semi-hollow or hollow extrusions. In the example, the cleats 346 extend into the cavity 310 and anchor the solid insulation material 356 within the cavity 310. In particular, the cleats 346 resist contraction and shrinkage of the solid insulation material 356 along the longitudinal axis $A_{300}$.

The solid insulation material 356 has a thermal conductance less than the material of the first wall 306, the second wall 308, the first flange 320, and/or the second flange 322. For example, the solid insulation material 356 may have a thermal conductance that is dependent on the density of the solid insulation material 212. The thermally enhanced extrudate may be filled with any suitable solid insulation material 212 having any suitable density. In some example embodiments, the solid insulation material 212 may have a density in a range of about 10 pounds per cubic feet (lbs./ft$^3$) to about 70 lbs./ft$^3$. In some example embodiments, the thermal conductance is in a range of about 0.21 British thermal units per hour square feet degrees Fahrenheit (Btu/(hr·ft$^{2.°}$ F.)) to about 0.840 Btu/(hr·ft$^{2.°}$ F.). The solid insulation material 356 substantially fills the cavity 310 of the extrudate 300 creating a thermal break that extends between the first wall 306 and the second wall 308 to reduce heat transfer through the extrudate 300.

After curing of the solid insulation material 356, the extrudate 300 may undergo a debridging operation. The debridging operation includes removal of one or more bridges 342, cleats 346, and/or flanges 320, 322 of the extrudate 300. In the example, the second flange 322 and the bridges 342 are debridged. In some example embodiment, at least a portion of the cleats 346 and a portion of the solid insulation material 356 may also be removed. For example, the solid insulation material 356 that expanded and extends out of the cavity 310 through the openings 340 may be removed during the debridging operation. Further, in some examples, the debridging operation may remove a portion of the solid insulation material 356 contained within the cavity 310. The debridging operation may be achieved by performing at least one of a cutting, milling, or boring operation. For example, a table mill may be used to mill out grooves extending along the longitudinal axis $A_{300}$.

In some examples, the bridges 342 and the second flange 322 are debridged simultaneously. In other embodiments, the bridges 342 and the second flange 322 are debridged in separate steps.

After the second flange 322 and the bridges 342 are debridged, the first wall 306 and the second wall 308 are not connected by the first flange 320, the second flange 322, and/or bridges 342. The first wall 306 and the second wall 308 may be attached together by the solid insulation material 356 disposed between the first wall 306 and the second wall 308 and/or other components attached to the extrudate 300. For example, the solid insulation material 356 may hold the extrudate 300 together until the unit 102 (shown in FIG. 1) is affixed to the extrudate 300.

Figure 5:
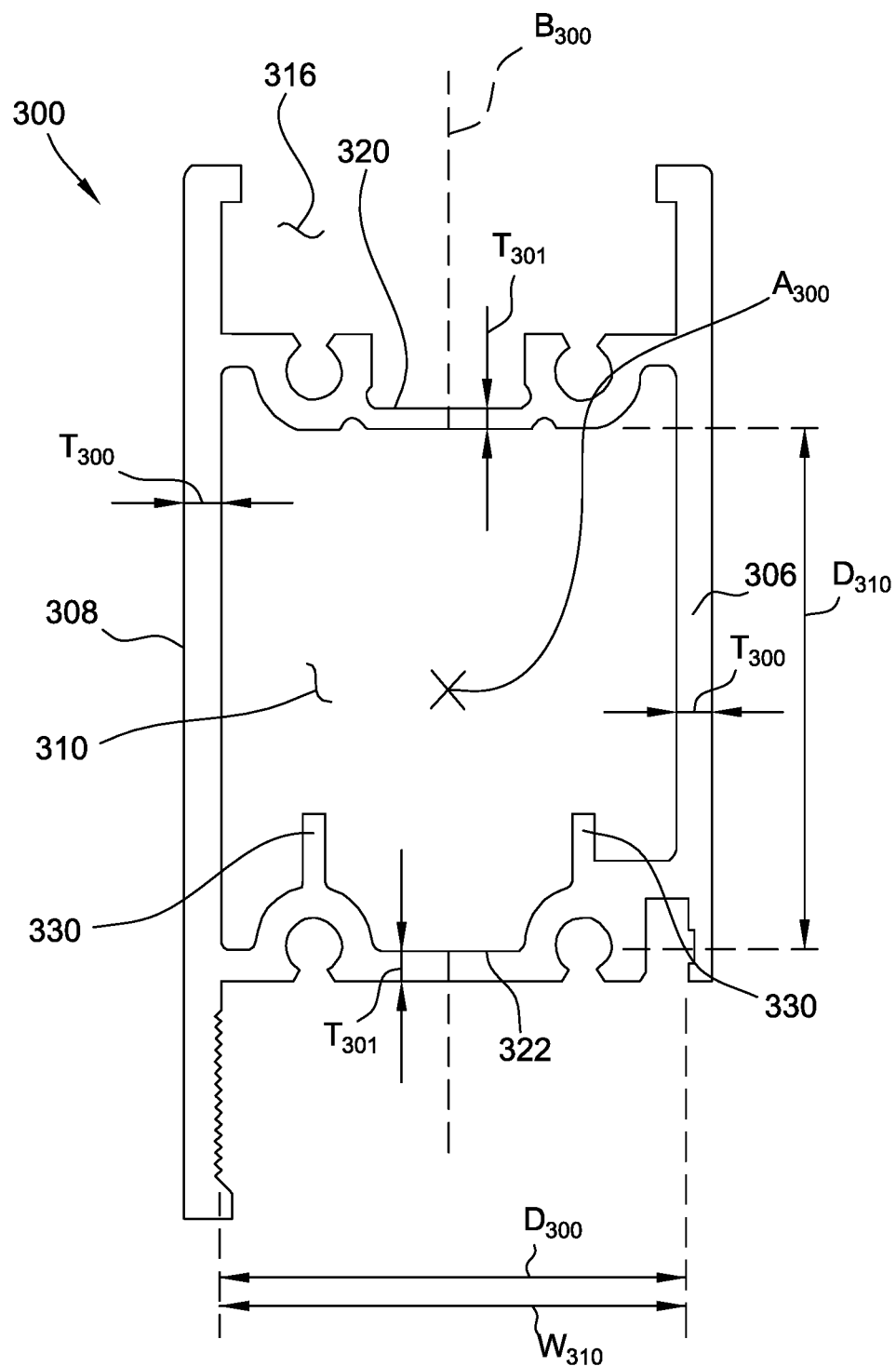
FIG. 5 is a cross-sectional view along line C-C of the extrudate shown in FIG. 4.

Referring to FIGS. 1, 2, and 5, the thermally enhanced extrudate 200 may be assembled from extrudate 300. Further, two or more thermally enhanced extrudates 200 may be attached together to form the frame 100 as shown in FIG. 1 and create a substantially continuous thermal break extending through frame 100. The frame 100 may be mounted to a window or door of a building, such that the frame 100 includes an exterior side and an interior side. The exterior side may be exposed to environmental conditions, i.e., the exterior of a building, while the interior side may be exposed to a thermally controlled room interior.

In some cases, a temperature differential exists between the exterior side of the frame 100 and the interior side of the frame 100. Likewise the thermally enhanced extrudates 200 that are attached together to from the frame 100 may have the first walls 306 that are on the exterior side of the frame and the second walls 308 that are on the interior of the frame. The thermal break creates a thermal barrier by interrupting the transfer of heat from the exterior side to the interior side or visa-versa. Accordingly, the interior side is able to have a temperature that is significantly different than the temperature of the exterior side. As a result, the thermally enhanced extrudate 200 reduces the transfer of heat between the exterior side and the interior side of the frame 100. The thermal cavity 310 may have a width in a range of about 1 inch (in.) to about 2 in.

Figure 11:
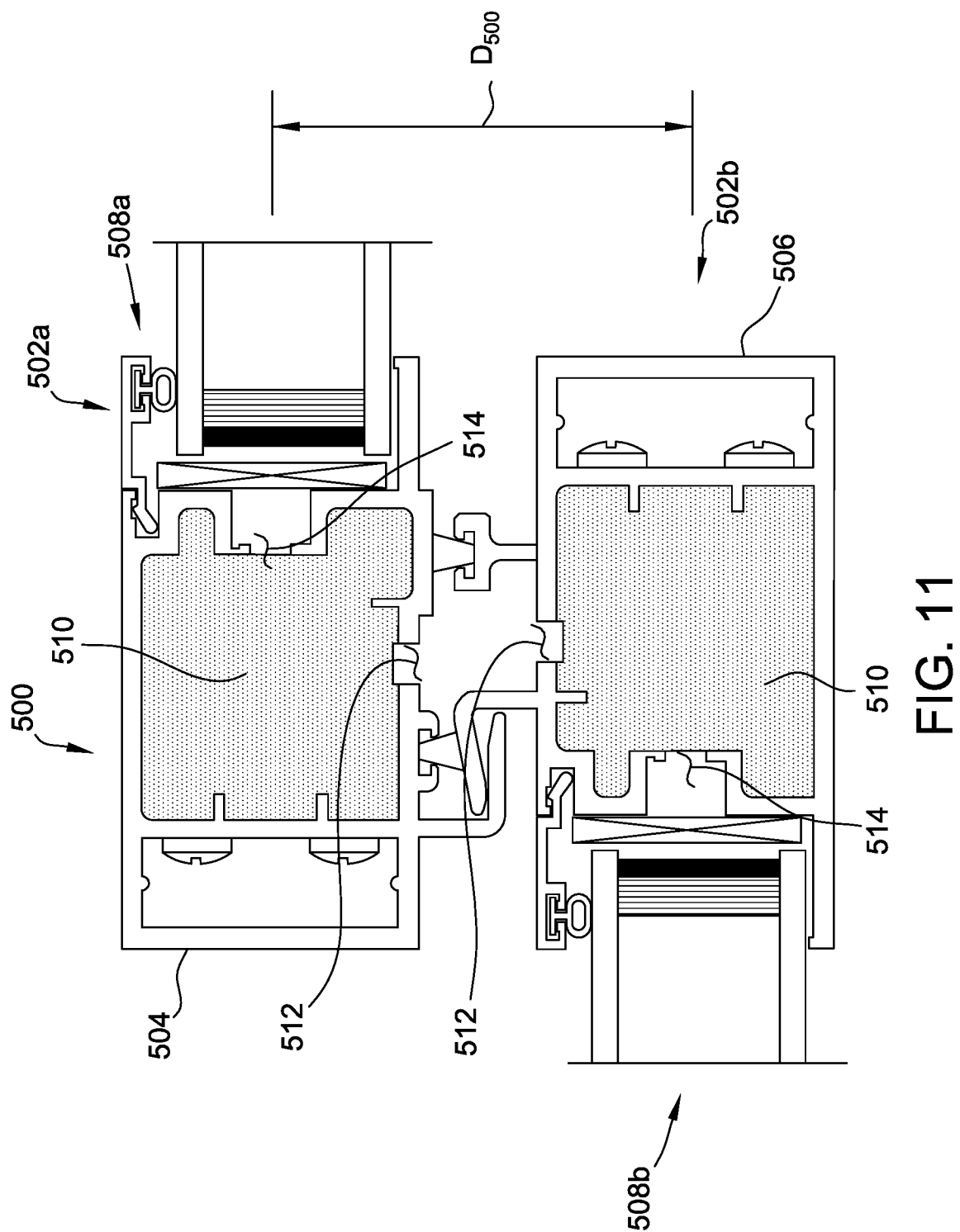
FIG. 11 is sectional view of a portion of an example frame including thermally enhanced extrudates.

FIG. 11 is a schematic sectional view of a portion of an example embodiment of a frame 500 that includes at least two thermally enhanced extrudates 502 attached together (e.g., a first thermally enhanced extrudate 502a and a second thermally enhanced extrudate 502b). The first thermally enhanced extrudate 502a is offset from the second thermally enhanced extrudate 502b enabling at least one of the first or second thermally enhanced extrudates 502a, 502b to move relative to the other. The first and second thermally enhanced extrudates are each arranged to receive a unit 508 (e.g., a first unit 508a and a second unit 508b). In this illustrated embodiment, the units 508 include a pair of parallel glass panes extending along an axis. The first thermally enhanced extrudate 502a is offset from the second thermally enhanced extrudate 502b such that pane unit 508a is offset from pane unit 508b, and separated by a distance $D_{500}$. The frame 500 includes a first side 504 and a second side 506 and defines a thermal cavity 510 intermediate the first side 504 and the second side 506. The thermal cavity 510 of the frame 500 may have a width in a range of about 1 inch (in.) to about 2 in. The thermal cavity 510 provides a substantially continuous thermal break extending through the frame 500 to reduce the transfer of heat through frame 500.

Each of the first and second thermally enhanced extrudates 502a, 502b further includes a first opening 512 and a second opening 514. In this illustrated embodiment, the first openings 512 of the first and second thermally enhanced extrudates 502a and 502b are aligned with each other and the second openings 514 are spaced apart from each other in a direction perpendicular to the axes of the units 508a, 508b. The second openings 514 are aligned with the corresponding unit 508a and 508b. Accordingly, the thermal break extends through the frame 500 in a generally z-shaped path between two adjacent extrudates 502. In other embodiments, the frame 500 may have any thermal cavity 510 that enables the window to operate as described.

Figure 12:
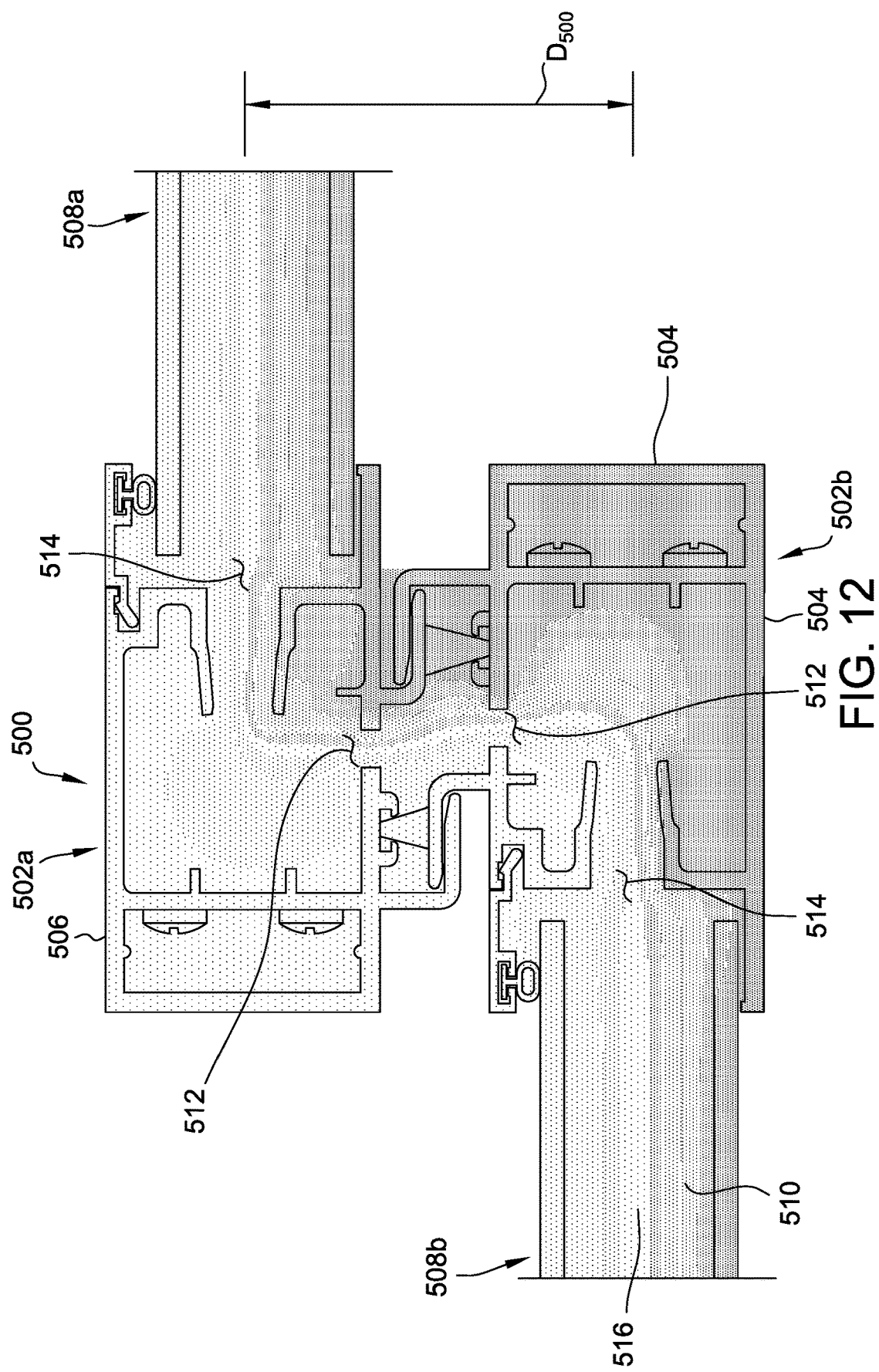
FIG. 12 is sectional view of a portion of the example frame shown in FIG. 11 showing temperature zones.
Figure 13:
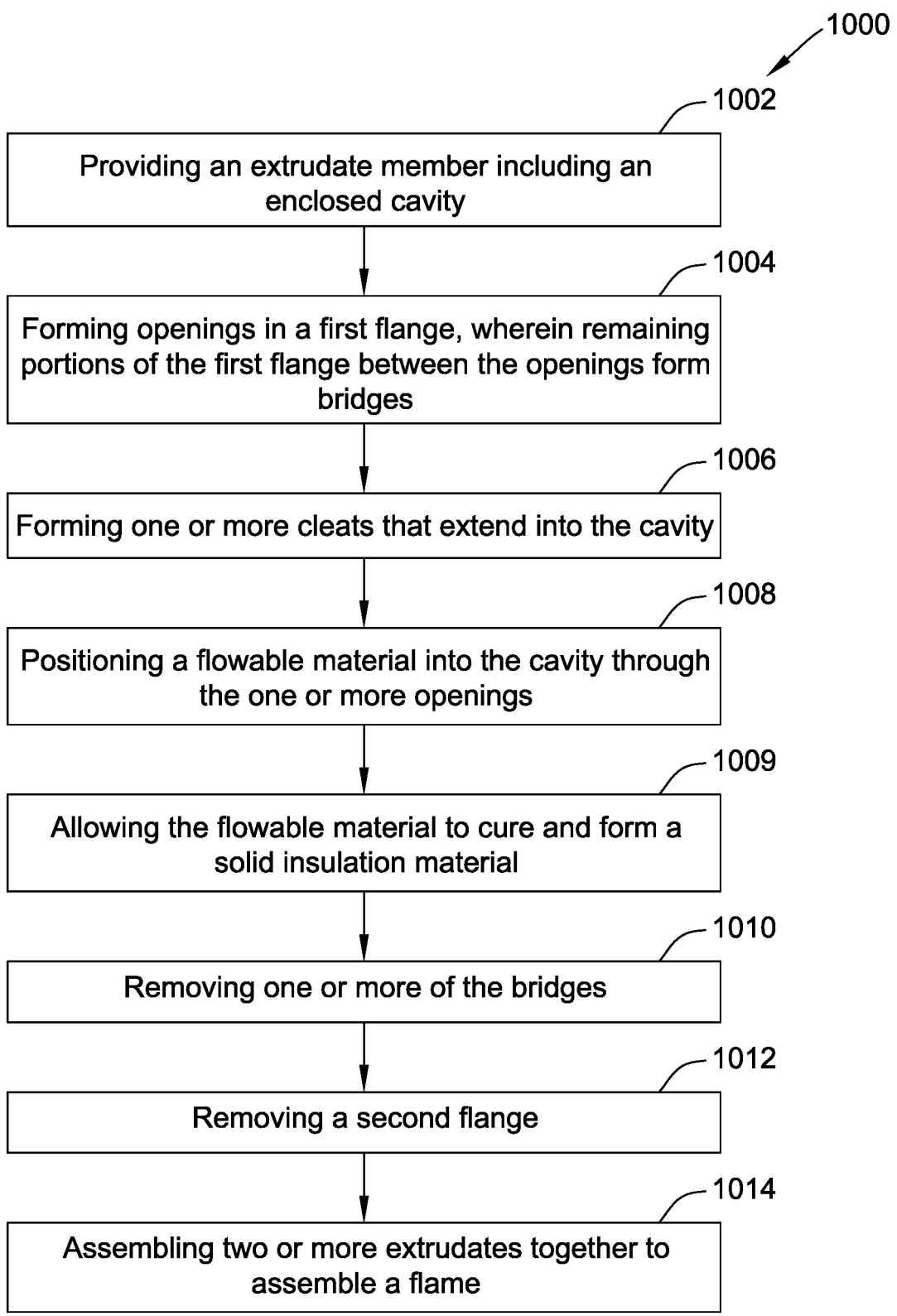
FIG. 13 depicts a flow chart of an example process of assembling a frame including thermally enhanced extrudates shown in FIGS. 2 and 3 or FIGS. 11 and 12.

FIG. 12 is a sectional view showing temperature zones of the frame 500. For example, the frame 500 may be positioned in the wall of a structure such that the first side 306 is on an exterior of the structure and the second side 308 is on an interior of the structure. In the illustrated embodiment, the first side 306 has a first temperature and the second side 308 has a second temperature. In this embodiment, the second temperature is greater than the first temperature because the interior of the structure is warmer than the exterior. Accordingly, heat has a tendency to flow from the interior of the structure towards the exterior. In other embodiments, the exterior may be warmer than the interior.

As shown in FIG. 12, the thermal cavity 510 defines a substantially continuous thermal break 516 extending through the frame 500. The thermal break 516 interrupts the transfer of hear from the first side 504 to the second side 506. As described above, the alignment of the first openings 512 and the offset alignment of second openings 514 enable the thermal break 516 to be generally z-shape and extend through the units 508a, 508b which are offset from each other. Accordingly, the second side 506 is able to have a temperature that is significantly less than the temperature of the first side 504. As a result, the frame 500 reduces the transfer of heat between the exterior and the interior of structure. In other example embodiments, adjacent thermally enhanced extrudates may be arranged to have thermal breaks 516 that extend continuously through the frame 500 in other suitable paths, e.g., curve or straight paths.

The frame 500 may be positioned in the wall of a structure such that the first side 504 is on an exterior of the structure and the second side 506 is on an interior of the structure. In the illustrated embodiment, the first side 504 has a first temperature and the second side 506 has a second temperature. In this embodiment, the second temperature is greater than the first temperature because the interior of the structure is warmer than the exterior. Accordingly, heat has a tendency to flow from the interior of the structure towards the exterior. In other embodiments, the exterior may be warmer than the interior. The thermal break 516 interrupts the transfer of heat from the first side 504 to the second side 506. Accordingly, the second side 506 is able to have a temperature that is significantly less than the temperature of the first side 504. As a result, the frame 500 reduces the transfer of heat between the exterior and the interior of structure.

In reference to FIGS. 1, 2, 5, and 11, a method of assembling a frame (e.g., the frame 100 or the frame 500) using at least two thermally enhanced extrudates (e.g., the thermally enhanced extrudates 200 or the thermally enhanced extrudates 502) includes providing 1002 an extrudate (e.g., the extrudate 300) including an enclosed cavity (e.g., cavity 310). The extrudate defines a longitudinal axis (e.g., longitudinal axis $A_{300}$) from a first end (e.g. first end 302) to a second end (e.g., second end 304) of the extrudate. The extrudate includes a channel (e.g., channel 316) extending along the longitudinal axis and shaped to receive a glass unit or operable vent frame (e.g., unit 102). The extrudate includes a first wall (e.g. first wall 306) and a second wall (e.g., second wall 308) spaced apart from the first wall. The extrudate further includes a first flange (e.g., first flange 320) and a second flange (e.g., second flange 322). In some examples the extrudate may be provided by extruding the described shape from aluminum stock. For example, the extrudate may be extruded from aluminum using a mandrel die, such that the extrudate includes a completely enclosed cavity extending along the longitudinal axis.

Method 1000 includes forming 1004 one or more openings (e.g., openings 340) in the first flange. The openings are spaced apart along the longitudinal axis of the extrudate. The openings may be formed at regular intervals along the longitudinal axis or the openings may be formed at irregular intervals. The remaining portions of the first flange between the openings form one or more bridges (e.g., bridges 342). Forming 1004 the openings may include cutting or punching the openings in the first flange. For example, a die including an edge shaped to cut the desired boundary of the openings may be forced through the first flange using a punch. In some cases the die may be placed within the cavity such that the die is pressed against the first flange and then the press may be forced against the first flange, pressing the first flange against and through the edge of the die.

Method 1000 may include forming 1006 one or more cleats (e.g., cleats 346) that extend into the cavity. The cleats may be formed when the one or more openings are formed. For example, the openings may be cut or punched out of the first flange and the cleats may be formed by portions of the first flange that are cut and pressed into the cavity while forming 1004 the openings.

Method 1000 of this embodiment further includes positioning 1008 a flowable material into the cavity. Positioning 1008 the flowable material includes positioning the flowable material through at least one of the openings and into the thermal break, such that the cavity is substantially filled with the flowable material. Positioning the flowable material may refer to injecting, packing, and/or pouring the flowable material through one or more of the openings. The flowable material is a non-solid material that may flow within the cavity and conform to the shape of the cavity. Accordingly, the flowable material may flow into edges and corners of the cavity when the flowable material is positioned in the cavity through the openings. Positioning 1008 may also include positioning the flowable material through a plurality of openings along the longitudinal axis, such that the flowable material may be uniformly distributed within the cavity along the longitudinal axis.

In some examples, method 1000 may include allowing 1009 the flowable material to cure and form a solid insulation material. The curing process may include supplying additional thermal energy and/or a catalyst to facilitate the curing process. For example, after the flowable material is positioned within the cavity, the extrudate may be placed near a heat source, under a heating lamp, within a heated chamber, and/or under a thermal covering. In other examples, the flowable material may be heated prior to positioning the flowable material within the cavity. The flowable material may also be exposed to the ambient environment during the curing process.

During the curing process, the flowable material generates heat and expands in this embodiment. For example, the curing process includes an exothermic reaction that releases heat. The bridges extending between the first wall and the second wall provide structural rigidity to the extrudate during the curing process. The bridges resist warping or deformation of the extrudate as the flowable material cures.

Upon curing, the solid insulation material of this embodiment cools and contracts within the cavity. In particular, the solid insulation material contracts along the longitudinal axis of the extrudate. The cleats anchored into the solid insulation material resist the shrinkage of the solid insulation material along the longitudinal axis.

Method 1000 further includes debridging 1010 one or more bridges after the flowable material cures into the solid insulation material. This may include cutting, milling, or boring operations to remove one or more of the bridges. In some examples, a portion of the solid insulation material may be removed when the bridges are debridged. In some examples, debridging 1010 may include positioning the extrudate 300 in a milling machine and using an end mill to perform a milling operation which creates a groove that extends along the longitudinal axis $A_{300}$ and removes the bridges 342 along the path of the end mill.

Method 1000 further includes debridging 1012 the second flange. The second flange may be debridged after the flowable material cures into the solid insulation material. In some examples, the second flange may be debridged using the same process that is used to remove the bridges. For example, after debridging 1010 the bridges, the thermally enhanced extrudate may be turned over and a milling operation may be performed on the other side of the thermally enhanced extrudate. In other examples, the bridges and flanges are debridged at the same time, or the second flange may be debridged before the bridges.

In some examples, debridging 1010 the bridges and debridging 1012 the second flange provides a thermal separation of the first and second walls because the first and second walls are no longer connected by the first flange or the second flange. Further, the thermal break includes the solid insulation material positioned between and connecting the first and second walls.

Method 1000 may further include assembling 1014 two or more thermally enhanced extrudates together to form a frame. The frame may have a thermal break between the first side of the frame and the second side of the frame. The frame may be used for window or door applications. The thermally enhanced extrudates may be attached together using, for example and without limitation, adhesives, fasteners, and/or any other suitable attachment means.

The steps of the method 1000 are illustrated and described in a specific order that provides advantages for the described embodiments. In other embodiments, the method steps may be performed in another order and may include additional or fewer operations than those described. For example, it is contemplated that executing or performing a particular operation before, contemporaneously with, or after another operation is within the scope of aspects of the method.

Compared to conventional thermally enhanced extrudates used for doors and window, the thermally enhanced extrudates of embodiments of the present disclosure have several advantages. For example, an extrudate used to form the thermally enhanced extrudates may be simpler to manufacture than at least some known extrudates because the extrudate has a completely enclosed cavity. Also, in some embodiments, the extrudate may be formed using a tool that is more durable and has a longer operational life than tools for semi-hollow shapes. In addition, the extrudate includes openings along the length of the extrudate and bridges that connect a first wall and a second wall of the extrudate. As a result, a flowable material may be positioned within the cavity through the openings and cured into a solid insulation material providing a thermal break between the first wall and the second wall. Further, the bridges provide structural rigidity during the curing process and limit warping and deformation of the extrudate due to the heat and expansion of the flowable material as it cures. Additionally, one or more cleats may be formed that extend from either the first or second wall and into the cavity. The cleats anchor to the solid insulation material limiting shrinkage of the solid insulation material over an extended period of time. For example, in some cases, the solid insulation material may expand and/or contract over time and/or in response to seasonal environmental changes and the cleats act to limit the shrinkage of the solid insulation material. Furthermore, either the extrudate and/or the thermally enhanced extrudate may be selected for use in various applications. The thermally enhanced extrudate may be extruded using the same tooling die that is used for extrudates that will not include a thermal break, eliminating the need to use additional and/or alternative tooling dies to create the thermally enhanced extrudate.

As used, the terms "about," "substantially," "essentially," and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A thermally enhanced extrudate for a door or a window, comprising:
   one extrudate comprising a first wall substantially parallel to a second wall,
   a channel extending along a longitudinal axis from a first end to a second end of the one extrudate and shaped to receive glass;
      a hollow cavity defined in part by the first wall and the second wall of the one extrusion, wherein the hollow cavity defined by the first wall and the second wall partially encloses a thermal break extending along the longitudinal axis and having a length, wherein the thermal break has a first width defined between the first wall and the second wall at an upper end of the thermal break and a second width defined between the first wall and the second wall at a lower end of the thermal break, the first width and the second width are equal; and
      a solid insulation material in the thermal break and substantially filling the hollow cavity between the first and second walls and formed by curing a flowable material,
   wherein the first wall and the second wall are attached by the solid insulation material that is disposed between the first wall and the second wall.

2. The thermally enhanced extrudate of claim 1, wherein a thickness of the first wall is equal to a thickness of the second wall.

3. The thermally enhanced extrudate of claim 1, further comprising cleats that extend into the thermal break from at least one of the first wall and the second wall and attach to the solid insulation material.

4. The thermally enhanced extrudate of claim 3, wherein each cleat is non-linear and extends at least partly parallel to the first and second walls.

5. The thermally enhanced extrudate of claim 3, wherein the cleats extend from the first wall and the second wall in an alternating pattern along the longitudinal axis.

6. The thermally enhanced extrudate of claim 1, wherein the first and second walls include metal that is shaped in an extrusion process, wherein the extruded shape of the metal is a hollow tube.

7. The thermally enhanced extrudate of claim 1, further comprising a bridge that defines an opening for placement of the flowable material into the thermal break, and wherein the bridge resists warping of the extrudate as the flowable material cures.

* * * * *